US012570328B2

(12) United States Patent
Spielberg et al.

(10) Patent No.: US 12,570,328 B2
(45) Date of Patent: Mar. 10, 2026

(54) AUTONOMOUS VEHICLE WITH CONTINGENCY CONSIDERATION IN TRAJECTORY REALIZATION

(71) Applicant: Motional AD LLC, Boston, MA (US)

(72) Inventors: Nathan Spielberg, Boston, MA (US); Thomas Kølbæk Jespersen, Singapore (SG); Georgios Mamakoukas, Boston, MA (US); Jesse Miller, Boston, MA (US); Bence Cserna, East Boston, MA (US)

(73) Assignee: Motional AD LLC, Boston, MA (US)

( * ) Notice: Subject to any disclaimer, the term of this patent is extended or adjusted under 35 U.S.C. 154(b) by 208 days.

(21) Appl. No.: 18/164,652

(22) Filed: Feb. 6, 2023

(65) Prior Publication Data

US 2024/0253668 A1      Aug. 1, 2024

(30) Foreign Application Priority Data

Jan. 27, 2023    (GR) ............................... 20230100064

(51) Int. Cl.
*B60W 60/00*      (2020.01)
*B60W 50/00*      (2006.01)

(52) U.S. Cl.
CPC .... *B60W 60/0027* (2020.02); *B60W 50/0097* (2013.01); *B60W 2050/0022* (2013.01); *B60W 2556/40* (2020.02)

(58) Field of Classification Search
CPC ......... B60W 60/0027; B60W 50/0097; B60W 2556/40; B60W 2050/0022
See application file for complete search history.

(56) References Cited

U.S. PATENT DOCUMENTS

| | | | |
|---|---|---|---|
| 11,675,362 B1 | 6/2023 | Cserna et al. | |
| 2018/0196439 A1* | 7/2018 | Levinson | .......... B60W 60/0027 |
| 2022/0043446 A1* | 2/2022 | Ding | .................... G05D 1/0214 |

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

* cited by examiner

*Primary Examiner* — Adnan M Mirza
(74) *Attorney, Agent, or Firm* — Knobbe, Martens, Olson & Bear, LLP

(57)      ABSTRACT

Provided are methods for determining a trajectory, which can include obtaining, using the at least one processor, sensor data associated with an environment in which a vehicle is operating, wherein the environment comprises one or more agents including a first agent; determining, using the at least one processor, based on the sensor data, a first prediction associated with the first agent; determining, using at least one processor, based on the first prediction, a primary homotopy; determining, using the at least one processor, based on the primary homotopy and the first prediction, one or more contingency homotopies associated with a contingency; determining, using the at least one processor, based on the primary homotopy and the one or more contingency homotopies, a primary trajectory; and providing, using the at least one processor, operation data associated with the primary trajectory to cause the vehicle to operate based on the primary trajectory.

18 Claims, 11 Drawing Sheets

900

902 Obtain primary homotopy

904 Obtain sensor data

906 Determine a first prediction

908 Determine a contingency homotopy

910 Determine a trajectory

912 Provide operation data

AUTONOMOUS VEHICLE WITH CONTINGENCY CONSIDERATION IN TRAJECTORY REALIZATION

CROSS-REFERENCE TO RELATED APPLICATIONS

The present application claims priority/benefit from Greek Patent Application No. 20230100064 filed on Jan. 27, 2023, entitled "AUTONOMOUS VEHICLE WITH CONTINGENCY CONSIDERATION IN TRAJECTORY REALIZATION," which is herein incorporated by reference in its entirety.

BACKGROUND

Autonomous vehicles can use a number of methods and systems for determining a trajectory for the autonomous vehicle. However, these methods and systems do not take into account all possible scenarios, such as unforeseen contingencies, which can lead to a slower reaction when a contingent situation occurs.

DETAILED DESCRIPTION

Figure 1:
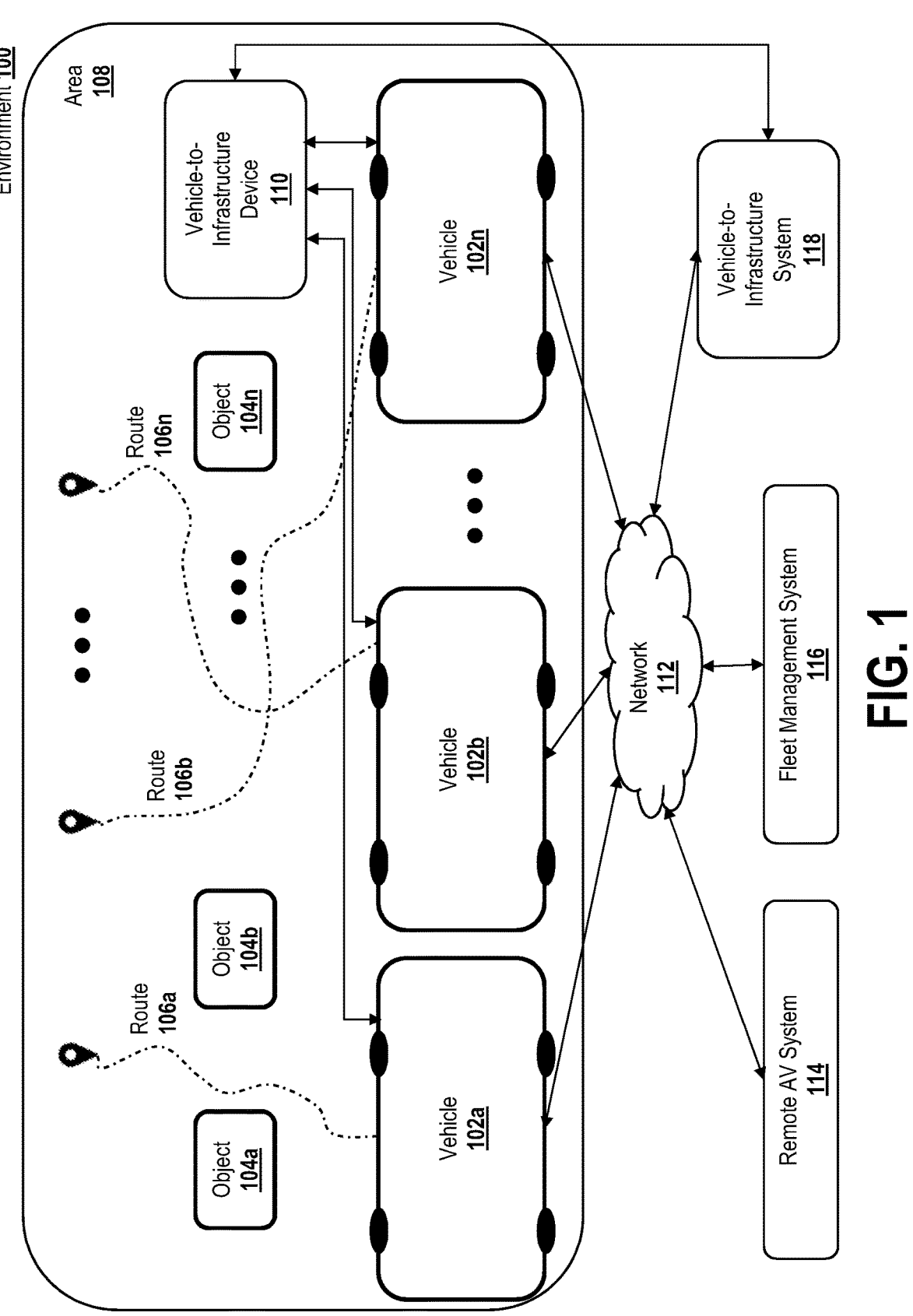
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

"At least one," and "one or more" includes a function being performed by one element, a function being performed by more than one element, e.g., in a distributed fashion, several functions being performed by one element, several functions being performed by several elements, or any combination of the above."

Some embodiments of the present disclosure are described herein in connection with a threshold. As described herein, satisfying, such as meeting, a threshold can refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement contingency trajectory realization during a trajectory realization process involved in operating a vehicle (e.g., an autonomous vehicle). For example, certain techniques disclosed involve identifying a contingency homotopy (worst case homotopy associated with an unexpected maneuver performed by an agent such as a pedestrian or other vehicle) that is associated with a nominal homotopy. In some embodiments, a homotopy is a class describing a set of trajectories, having a same start location and a same end location for which there exists a continuous deformation from one to another while remaining within the class at an instant. In other words, a homotopy can be seen as a corridor in space and time, such as a drivable corridor. A homotopy can be seen as (e.g., represent) one or more maneuvers. In some examples, a homotopy can be associated with one or more constraints applied to potential trajectories of the vehicle. These constraints can be applied in a 2D space, such as in x and y coordinate system. In some examples, constraints are station constraints and/or spatio-temporal constraints (e.g., time-dependent spatial constraints and/or lateral constraints). In these examples, the homotopy can define the scope of potential trajectories taking into account the constraints imposed by any obstacle in the environment (e.g., any object, any agent). One or more constraints are then applied when generating and/or realizing the trajectory. In some examples, these constraints are applied to a system generating trajectories (e.g., a planning system and/or a control system) for a common duration (e.g., for an amount of time, a distance, etc.) when the system is realizing (e.g., generating) trajectories. As a result, trajectories are realized based on both the contingency homotopy and the nominal homotopy, simultaneously. A primary trajectory that is optimized based on the contingency homotopy and the nominal homotopy and optionally the contingency trajectories can be added to a trajectory pool, readily available to the AV to control operation of the AV. As a result, the trajectory realization results in trajectories that are associated with safe and proactive operation of the autonomous vehicle (AV), should a contingency (worst case) actually occur.

By virtue of the implementation of systems, methods, and computer program products described herein, the AV proactively considers the possibility that a contingency (such as a worst case scenario) may occur and not just react to such a scenario when it is observed to occur, for example by proactively biasing away from children or bike-riders on the side of the road and/or biasing away from cars on the highway that exhibit reckless behavior. Further, the disclosed techniques decouple the homotopy generation and performance in the nominal scenario and in the worst-case scenario, which leads to behaviors more similar to human drivers. In other words, even if the nominal trajectory generated considers both nominal homotopy and contingency homotopy, the nominal homotopy and the contingency homotopy describing the behavior are decoupled and can thus be generated and described independently. Additionally, robustness of the predictions in the planning and control stack is improved. The disclosed techniques can handle general multi-modal predictions and not just worst-case scenarios.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

Figure 9:
FIG. 9 is a flowchart of an example process for considering contingency in trajectory realization.
Figure 9:
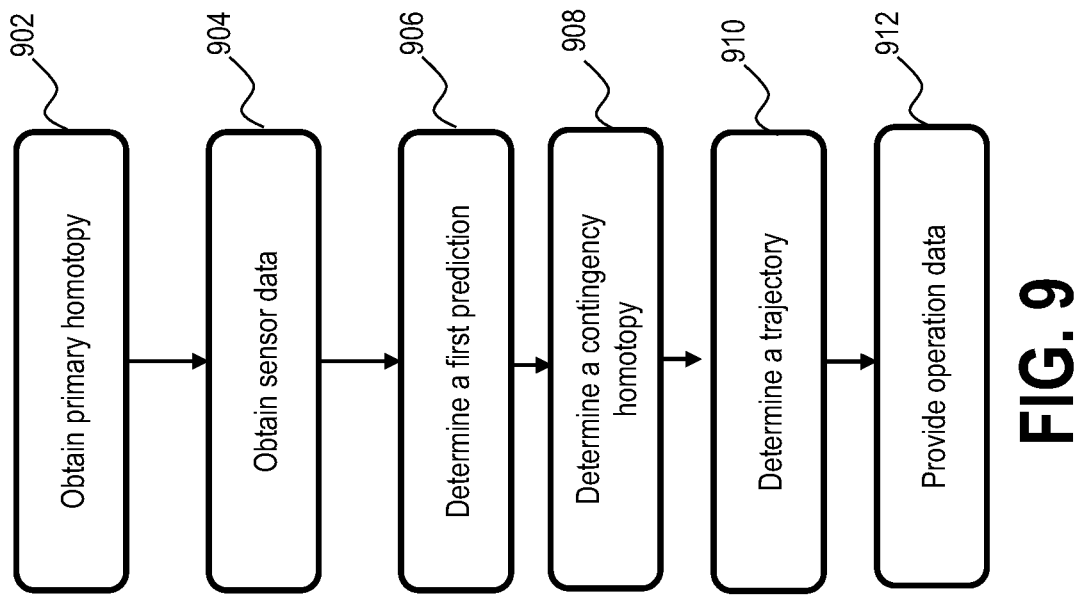

In some embodiments, device 300 is configured to execute software instructions of one or more steps of the disclosed method, as illustrated in FIG. 9.

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
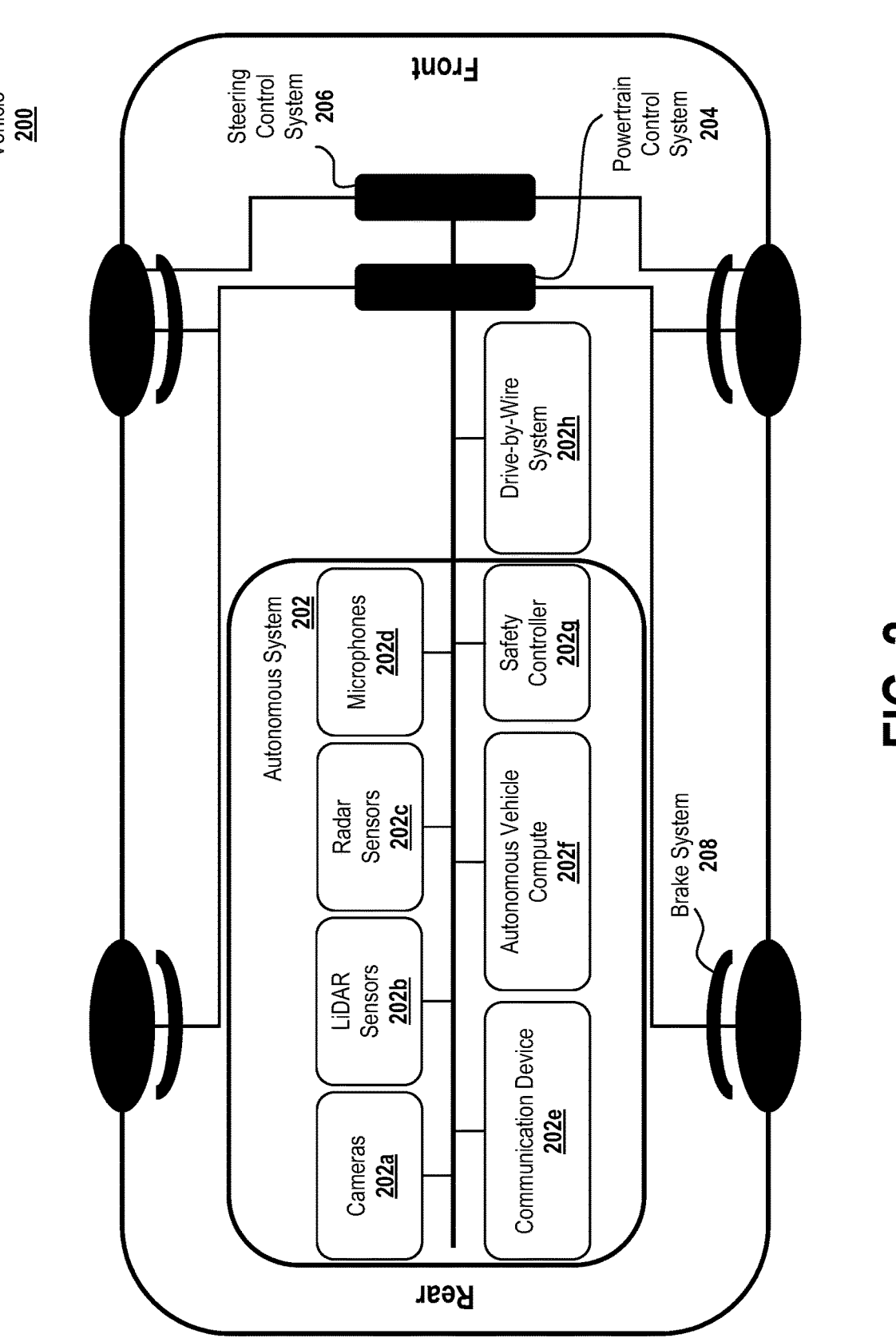
FIG. 2 is a diagram of one or more example systems of a vehicle including an autonomous system.

Referring now to FIG. 2, vehicle 200 (which may be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
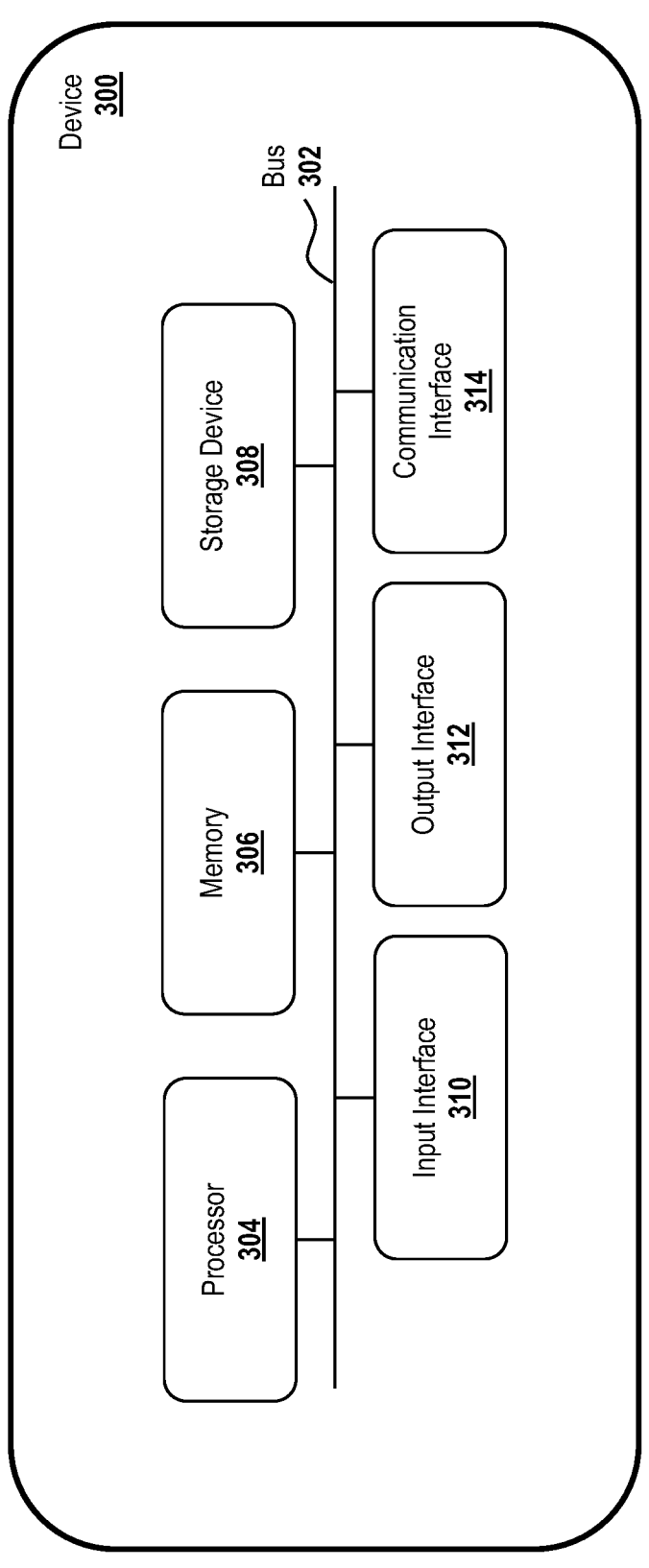
FIG. 3 is a diagram of components of one or more example devices and/or one or more example systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 make longitudinal vehicle motion, such as to start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate. In other words, steering control system 206 causes activities necessary for the regulation of the y-axis component of vehicle motion.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, fleet management system 116, V2I system 118, and/or one or more devices of network 112 (e.g., one or more devices of a system of network 112). In some embodiments, one or more devices of vehicles 102 (e.g., one or more devices of a system of vehicles 102 such as at least one device of remote AV system 114, fleet management system 116, and V2I system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
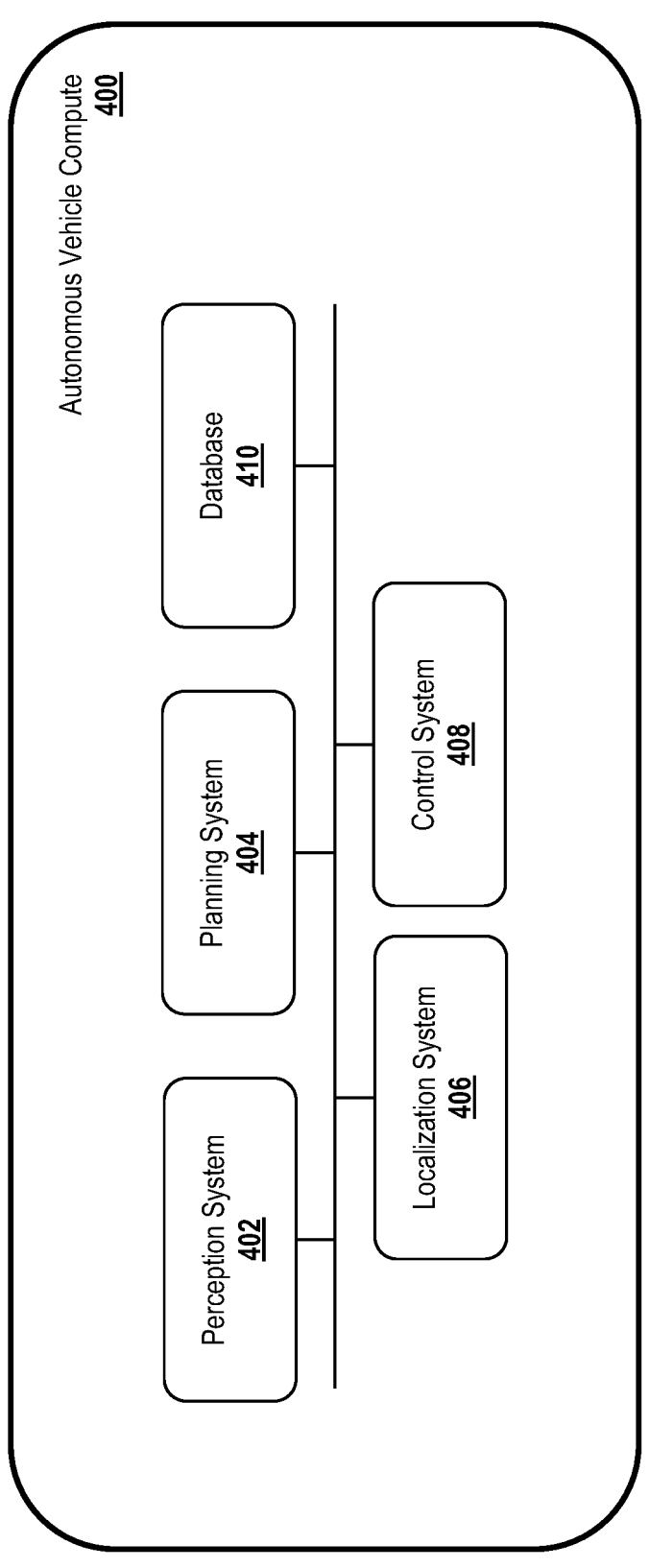
FIG. 4 is a diagram of certain components of an example autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
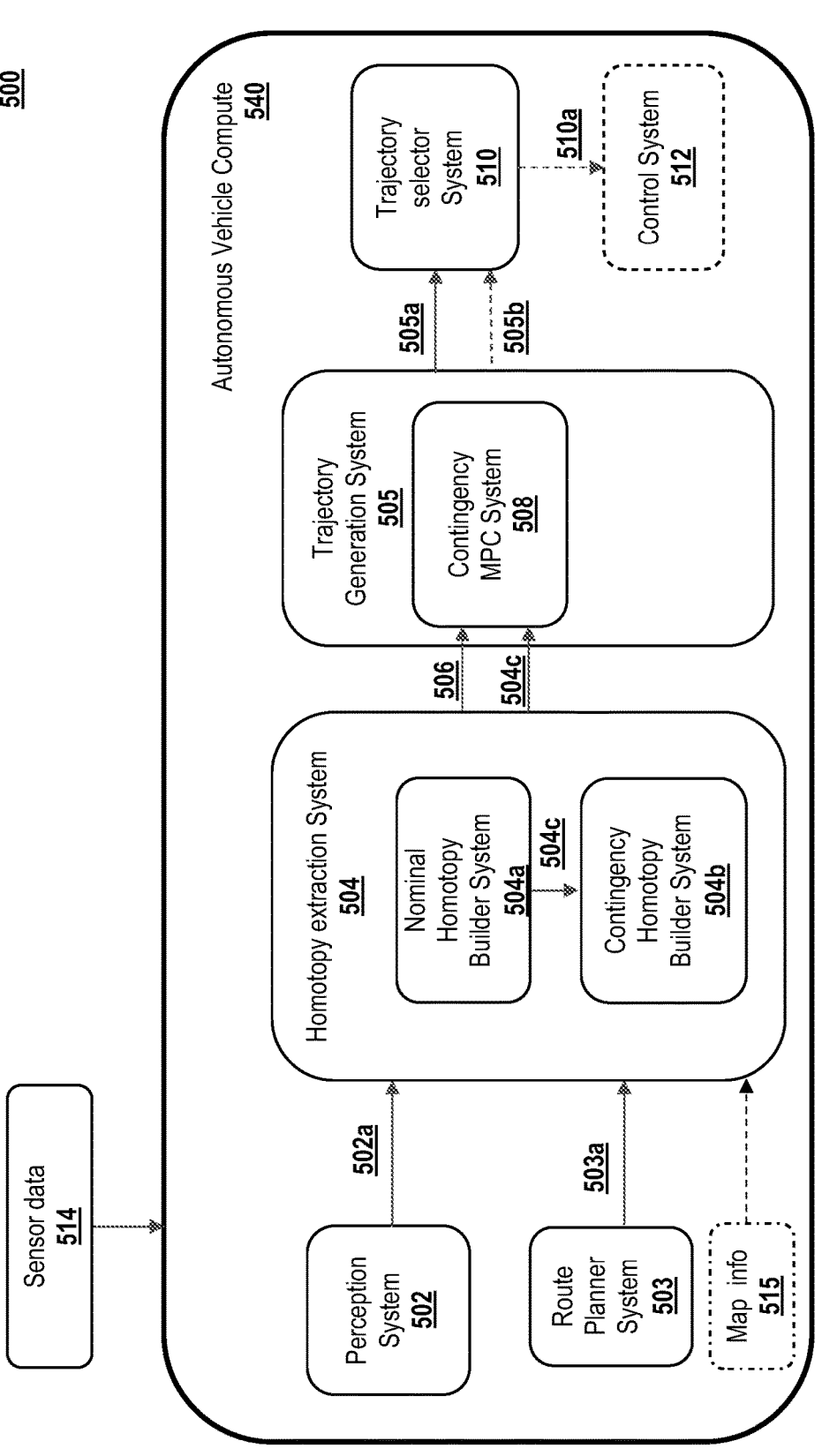
FIG. 5 is a diagram of an example implementation of a system according to this disclosure.

Referring now to FIG. 5, illustrated is a diagram of a system 500 for considering contingencies during trajectory realization. In some embodiments, one or more components of system 500 are included in (or implemented by) a planning system of an AV compute (e.g., a system that is the same as, or similar to, planning system 404 of AV compute 400). Additionally, or alternatively, one or more components of system 500 are included in (or implemented by) a system different from (or in cooperation with) the planning system of an AV compute. For example, one or more components of system 500 can be included in (or implemented by) a control system (e.g., a system that is the same as, or similar to, control system 408 of AV compute 400). In this example, the control system can operate independent of the planning system or in coordination with the planning system. In some embodiments, one or more components of system 500 are included in (or implemented by) one or more systems of vehicle 102, vehicle 200, and/or AV compute 400, alone or in coordination with one another that are different from, or include, the planning system and the control system. In some examples, the system 500 is implemented on a vehicle, such as an autonomous vehicle, such as a vehicle capable of autonomous operation in accordance with Society of Automotive Engineers (SAE) levels 4 and/or 5.

In one or more embodiments or examples, the system 500 is in communication with one or more of: a device (such as device 300 of FIG. 3), a localization system (such as localization system 406 of FIG. 4), a planning system (such as the planning system 404 of FIG. 4), a perception system (such as the perception system 402 of FIG. 4), and a control system (such as the control system 408 of FIG. 4).

In some embodiments, the system 500 is configured to obtain sensor data 514 associated with an environment (e.g., an environment in which a vehicle is operating). In examples, the sensor data 514 is indicative of (e.g., represents) an environment (e.g., including objects) around an autonomous vehicle. In one or more examples or embodiments, the system 500 obtains the sensor data 514 from one or more sensors associated with the vehicle. Sensors can include one or more of the sensors that are the same as or similar to those illustrated in FIG. 2 (for example cameras 202a, LiDAR sensors 202b, radar sensors 202c, and/or microphones 202d). In one or more examples, the sensor data 514 includes one or more of: radar data, camera data, image data, audio data, and LIDAR data.

In some examples, the environment includes one or more agents including a first agent (as illustrated in FIG. 1). An agent can be considered any object in the environment capable of dynamic movement. Examples of agents include pedestrians, vehicles, and bicycles. In some examples, the sensor data 514 is associated with information regarding the agent relative to the environment. For example, the sensor data 514 can be associated with a location and/or movement of the agent in the environment and/or the like. In some examples, the environment includes one or more static obstacles, such as infrastructure equipment, and/or buildings. In some examples, the environment includes no agents. In one or more examples, where the environment includes no agent but one or more static obstacles, the contingency homotopy (and optionally predictions) may be determined by considering a hidden agent, such as a pedestrian occluded by a car.

In some embodiments, the system 500 determines a first prediction 502a associated with the first agent based on the sensor data. For example, the system 500 can include or otherwise implement a perception system 502 which determines at least one prediction based on the sensor data. In this example, each prediction is associated with a corresponding agent in the environment. In some examples, the prediction is a nominal prediction regarding the location and/or movement of the agent e.g., to a different location, where nominal is meant to represent expected movement (e.g., walking across a crosswalk, driving in-lane, stopping at a stop sign, and/or the like). In some embodiments, the prediction is a worst-case prediction. For example, a worst-case prediction can be a prediction regarding location and/or movement of an agent in a direction other than the direction corresponding to the nominal prediction. In an example, an agent (e.g., a pedestrian) may be associated with a worst-case prediction whereby the agent steps off of a non-drivable surface (e.g., a sidewalk) onto a drivable surface (e.g., a roadway). In another example, a worst-case prediction can be associated with an agent biasing toward a lane that the agent is not expected to operate in. In yet another example, a worst-case prediction can be associated with an agent unexpectedly slowing down while operating in a lane. In some examples, the nominal prediction does not take into consideration a contingency (e.g., stepping out of a crosswalk, driving against traffic or in two or more lanes, driving through a stop sign, and/or the like). In these examples, a nominal prediction is associated with an agent's expected (or most likely) action (e.g., movement or non-movement). For example, where a pedestrian is an agent, a nominal prediction can be a likelihood that the agent will cross at a cross walk.

In some examples, a prediction is a multi-modal prediction. For example, a multi modal prediction can include multiple nominal predictions and/or multiple contingency predictions. In one example, a multi modal prediction can include a first prediction of an agent (e.g., a vehicle) operating in a lane at a constant speed and a second prediction of the agent switching from its current lane to another lane. In some embodiments, a contingency is a worst-case situation, such as an unforeseen hazardous situation. For example, a contingency involving a vehicle as an agent can include a situation where the vehicle suddenly breaks to come to a sudden stop while the stopping vehicle is in front of another vehicle (see, e.g., FIG. 7A). In this example, a nominal prediction would be for the agent to continue, and a contingency would be that an agent (the stopping vehicle) suddenly stops.

In some embodiments, the system 500 determines a primary homotopy (such as a nominal homotopy) associated with a nominal operation of the vehicle based on the first prediction. For example, the system 500 can include a homotopy extraction system 504 with a nominal homotopy builder system 504a. In this example, the nominal homotopy builder system 504a determines one or more nominal homotopies 504c based on one or more predictions from the perception system 502. In some embodiments, the nominal homotopy is not based on the possibility of a contingency. In other words, in some examples, the system 500 is designed such that the nominal homotopy generation is independent from the contingency homotopy generation. For example, the nominal homotopy 504c can be indicative of a drivable corridor associated with a maneuver, e.g., from a first location to a second location (such as from a space around a first location to a space around a second location). In this example, maneuvers can include operating a vehicle within a lane, switching between lanes, operating a vehicle through a turn, stopping, or moving the vehicle from a location, and/or the like.

In some embodiments, the system 500 determines one or more contingency homotopies 506 (e.g., worst-case homotopy, set of worst-case maneuvers) associated with a contingent operation of the vehicle based on the primary homotopy 504c and the first prediction 502a. For example, a contingency homotopy can include a homotopy generated in preparation of (e.g., to address) a contingency occurring. In some embodiments, the system 500 includes a contingency homotopy builder system 504b which determines one or more contingency homotopies 506 based on the nominal homotopies (e.g., primary homotopy 504c) and the predictions (e.g., 502a). In one or more examples, the system 500 includes a homotopy extraction system 504 including the nominal homotopy builder system 504a and the contingency homotopy builder system 504b.

In some embodiments, the system 500 includes for example a route planner system 503 configured to provide route data 503a, e.g., a route plan. The homotopies are for example extracted along the route provided by the route data 503 e.g., by ensuring that necessary lane changes are considered.

In some embodiments, the system 500 determines a primary trajectory 505a (e.g., a trajectory optimized to consider contingencies), based on the primary homotopy and the one or more contingency homotopies 506. In some examples, the system 500 includes trajectory generation system 505 which determines one or more trajectories based on the nominal homotopy (e.g., 504c) and the contingency homotopy 506.

In some embodiments, the system 500 provides operation data 510a associated with the primary trajectory 505a to cause the vehicle to operate based on the primary trajectory 505a. For example, the operation data 510a is provided to a control system 512 of system 500 for controlling the vehicle. The operation data is used for controlling the vehicle so as to enable the vehicle to navigate along the primary trajectory 505a. For example, providing the operation data 510a includes generating operation data for a control system of an autonomous vehicle (including any external systems). For example, providing the operation data 510a includes controlling the vehicle based on the operation data to navigate along the primary trajectory. For example, controlling the vehicle includes controlling a control system of an autonomous vehicle and/or an external system based on control data.

In some embodiments, the system 500 determines, based on the primary homotopy 504c and the first prediction 502, the one or more contingency homotopies 506. For example, the system can determine the one or more contingency homotopies by adding, based on map information 515 (e.g., occluded because of topography) and perception information (e.g., sensor data), at least one hallucinated agent in an occluded part of a map of the operating environment of the vehicle. For example, the system can determine the one or more contingency homotopies by obtaining the one or more contingency homotopies from a set of predetermined worst-cases based on a specified scenario associated with the first agent proximate to the vehicle or the at least one hallucinated agent. In these examples, the homotopy extraction system 504 adds at least one hallucinated agent in an occluded part of a map of the environment of the vehicle based on map information and/or sensor data. In these examples, the homotopy extraction system 504 obtains the one or more contingency homotopies from a set of predetermined worst cases (e.g., a set of N candidate contingency homotopies). In these examples, the homotopy extraction system 504 combines and/or selects and/or extracts one or more most constraining contingency homotopies (e.g., less than or equal to N) amongst the N candidate contingency homotopies, e.g., at each time instance and/or for each travel segment. Examples of predetermined worst-cases based on the specified scenario associated with the first agent proximate to the vehicle or the at least one hallucinated agent includes a case where an agent brakes abruptly in front of the vehicle, a case of aggressive lane cut-in by an agent, a case with agents outside precedence model, a case with jaywalkers, and/or a case with cyclists disobeying rules. In some examples, the contingency homotopy is based on the worst case scenarios with no hallucinated agent.

In one or more examples, the system 500 obtains the one or more contingency homotopies from the predetermined worst-cases which are associated with a location of the vehicle relative to the map (e.g., occluded because of topography). In one or more examples, the system 500 obtains the one or more contingency homotopies from the predetermined worst-cases which are based on semantics related to the first agent and/or to the environment. For example, the predetermined worst cases can be based on whether the first agent is located on a non-drivable surface (e.g., a sidewalk), a drivable surface (e.g., a cross walk, a road lane, etc.), and/or the like. For example, the predetermined worst cases can be based on whether the first agent is among parked vehicles with a pedestrian present. For example, the predetermined worst cases can be based on a pedestrian crosswalk behavior.

In one or more examples, the system 500 (e.g., via the homotopy extraction system 504) determines one or more sets of constraints based on the first prediction 502a. In some examples, each set of constraints characterizes a contingency homotopy 506. In some examples, the prediction defines the one or more constraints characterizing the contingency homotopy. In one or more examples, a set of constraints comprises one or more of: one or more spatio-temporal constraints (e.g., one or more spatio-temporal constraints associated with the first agent) and one or more station constraints (e.g., one or more station constraints associated with the first agent, e.g. station-time constraints).

In one or more examples, the system 500 or the trajectory generation system 505 determines one or more contingency trajectories 505b, based on the primary homotopy 504c and the one or more contingency homotopies 506. In one or more examples, the contingency trajectory can be taken into account for the trajectory scoring or selection in the trajectory selector system 510.

In one or more examples, the system 500 or the trajectory generation system 505 determines the primary trajectory 505a based on the primary homotopy 504c, the one more contingency homotopies 506, and a Model Predictive Controller (MPC) (e.g., a contingency MPC system 508). For example, the trajectory generation system 505 applies MPC on the nominal homotopy 504c and the one or more contingency homotopies 506. In other words, for example, the MPC takes as input the nominal homotopy 504c, and the one more contingency homotopies 506 and outputs the primary trajectory 505a. Stated differently, for example, the MPC considers all probable outcomes simultaneously and finds an optimal trajectory that adheres to all of them independently of the outcome. For example, the MPC can include scenarios preceding a sudden braking case (e.g., emergency brake) and/or avoidance of an obstacle at the side of the road (e.g., lane change right, lane change left). In one or more examples, the system 500 or the trajectory generation system 505 (e.g., via the contingency MPC system 508) determines the primary trajectory 505a and one more contingency trajectories 505b based on one or more actions for the vehicle. In some examples, the primary trajectory 505a and the one or more contingency trajectories 505b share one or more actions. For example, the nominal trajectory and the one or more contingency trajectories share one or more actions e.g., for safety, e.g., for one or more stems of a trajectory. The one or more actions may be seen as a set of shared controls and/or a set of shared states (such as a series of shared control and/or a series of shared states, candidate discrete futures, candidate horizons and/or candidate rollouts). For example, the candidate horizons (e.g., rollouts) include a nominal horizon associated with the nominal (also called primary) homotopy and a contingency horizon associated with the contingency homotopy. For example, the nominal horizon associated with the nominal (also called primary) homotopy, and the contingency horizon are coupled by sharing one or more actions early in the time horizon (a common stem period) so as to guarantee that independently of the outcome, e.g. independently of which prediction holds true, the common stem period of the generated trajectory always satisfies all considered outcomes.

In one or more examples, as part of the determination of the primary trajectory and/or of the one or more contingency trajectories, the system 500 determines a nominal cost for the primary (also called nominal) trajectory 505a and one or more contingency costs based on the one or more contingency trajectories 505b. In one or more examples, as part of the determination of the primary trajectory and/or of the one or more contingency trajectories, the system 500 applies a set of weights to the nominal cost and to the one or more contingency costs. In some examples, each weight in the set of weights is indicative of the probability of particular contingency happening. In one or more examples, the set of weights comprises one or more predetermined weights (e.g., prior to execution, and/or prior run time, e.g., set and/or tuned arbitrarily). For example, a weight $Q\_c$ in range of [0, 1] weighs the probability of contingency and allows for a convex combination between nominal and contingent costs. When $Q\_c$ is 0, nominal performance without considering the contingency is obtained. When $Q\_c$ is 1, the optimization is for contingency and the nominal homotopy is ignored. In some embodiments, the MPC system 508 implements a cost function with nominal and worst-case constraints, which can be represented mathematically by Equation [1]:

$$\min_{x,u,\lambda,x_c,u_c,\lambda_c} \sum_{i=1}^{N} \left( (1 - Q_c)J_{stage}(x^i, u^i, \lambda^i) + Q_c J_{stage_c}(x_c^i, u_c^i, \lambda_c^i) \right) + \quad [1]$$

$$(1 - Q_c)J_{terminal}(x^N) + Q_c J_{terminal}(x_c^N)$$

$$x^{i+1} = f(x_i, u_i)$$

$$x_c^{i+1} = f(x_c^i, u_c^i)$$

$$C^i(x^i, u^i, \lambda^i) \le 0$$

$$C_c^i(x_c^i, u_c^i, \lambda_c^i) \le 0$$

$$x \in X$$

$$x_c \in X_c$$

$$u \in U$$

$$u_c \in U_c$$

$$\lambda \in \Lambda$$

$$\lambda_c \in \Lambda_c$$

$$x^i = x_c^i \quad \forall \ i \le i_{pin}$$

In Equation [1], $C^i(x^i, u^i, \lambda^i) \le 0$ are nominal constraints and $C^i(x_c^i, u_c^i, \lambda_c^i) \le 0$ are worst-case constraints. It is noted that the equation is for an example with one contingency homotopy. This may be generalized to be applied to a plurality of contingency homotopies where additional terms are added to the cost and $(1\text{-}Q\_c)$ is replaced by $(1\text{-sum} (Q\_c,n))$.

In some embodiments, the system 500 includes trajectory selector system 510 configured to select one or more trajectories amongst the trajectories provided by the trajectory generation system 505. In some examples, the system 500 or the trajectory selector system 510 selects one or more trajectories amongst the trajectories provided by the trajectory generation system 505 based on a scoring hierarchy including one or more of: safety cost, violation cost, comfort cost, route adherence cost, and progress cost etc. In some examples, the system 500 provides operation data associated with the selected trajectory and/or the primary trajectory to cause the vehicle to operate based on the selected trajectory.

In one or more examples, the system 500 scores the primary trajectory and the one or more contingency trajectories. For example, the system 500 provides operation data associated with the contingency trajectory and/or the primary trajectory to cause the vehicle to operate based on the scoring of the primary trajectory and the contingency trajectory. Stated differently, the trajectory with a higher score may be indicated in the operation data for the vehicle to navigate along the trajectory. For example, the performance is considered in the case in which the worst case does occur, so the scoring function in the trajectory selector system can consider the worst case predictions with some probabilistic weighting (e.g., similar to the cost function used for Contingency MPC). In some examples, the system 500 provides operation data which cause the vehicle to operate using one of the primary trajectory and the contingency trajectory. For example, the system 500 provides operation data based on the primary trajectory and the contingency trajectory which cause the vehicle to operate using one of the primary trajectory and the contingency trajectory.

In one or more examples, the system 500 adds the contingency trajectories to a pool of alternative trajectories which can be used and scored similarly.

It may be envisaged that the contingency trajectory is optimized over the longitudinal variables, then the resulting longitudinal contingency trajectory can be input into the Alternative Trajectory Generator to generate a complete trajectory to be used in a scoring, e.g., based on safety, comfort or other aspects. In some examples, the Contingency MPC handles multi-modal predictions using the worst-case mode. In some examples, all modes can be considered into one joint optimization problem.

Figure 6A:
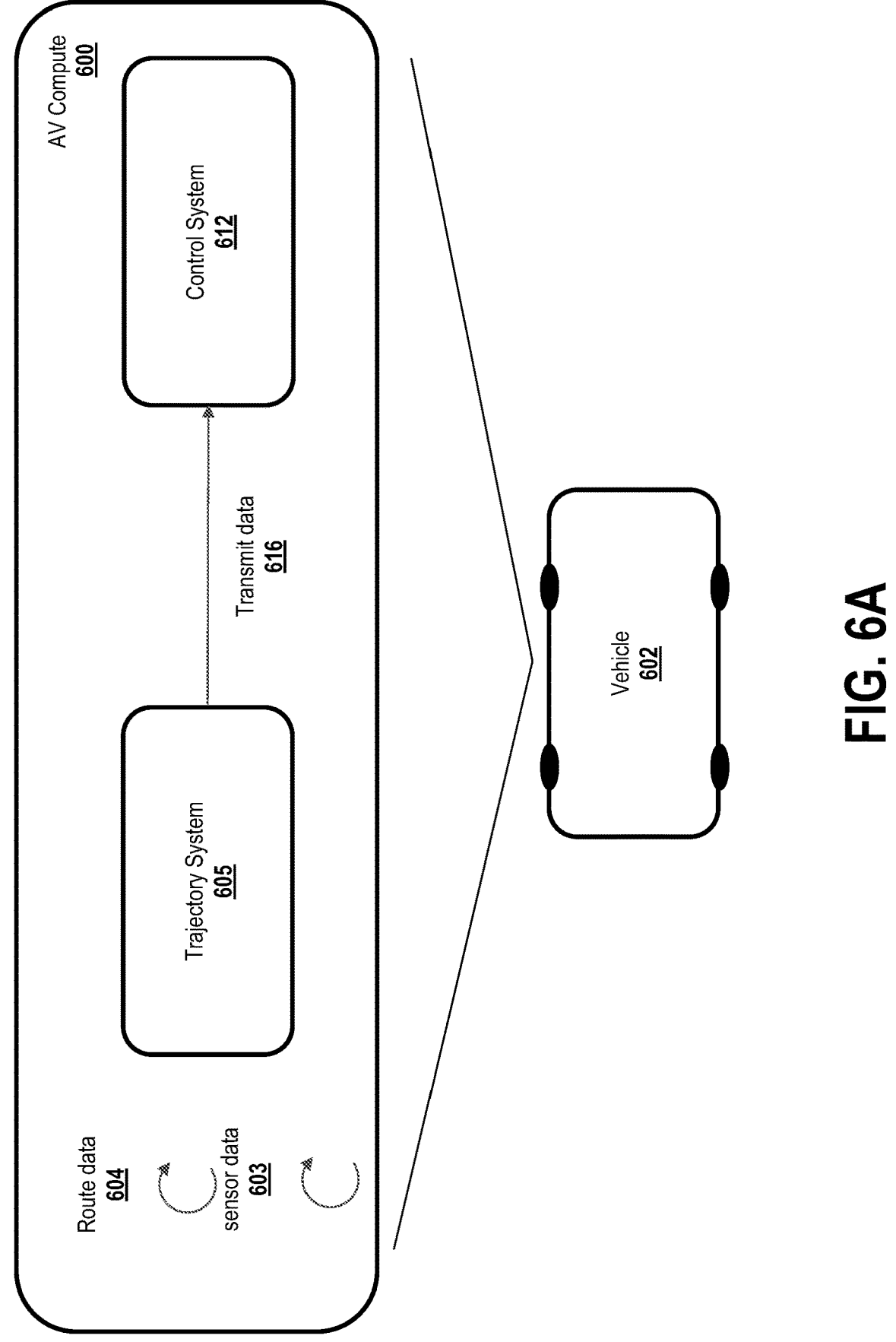
FIGS. 6A-6B are diagrams of an example implementation of a process for operating a vehicle based on trajectory realization according to this disclosure.
Figure 6B:
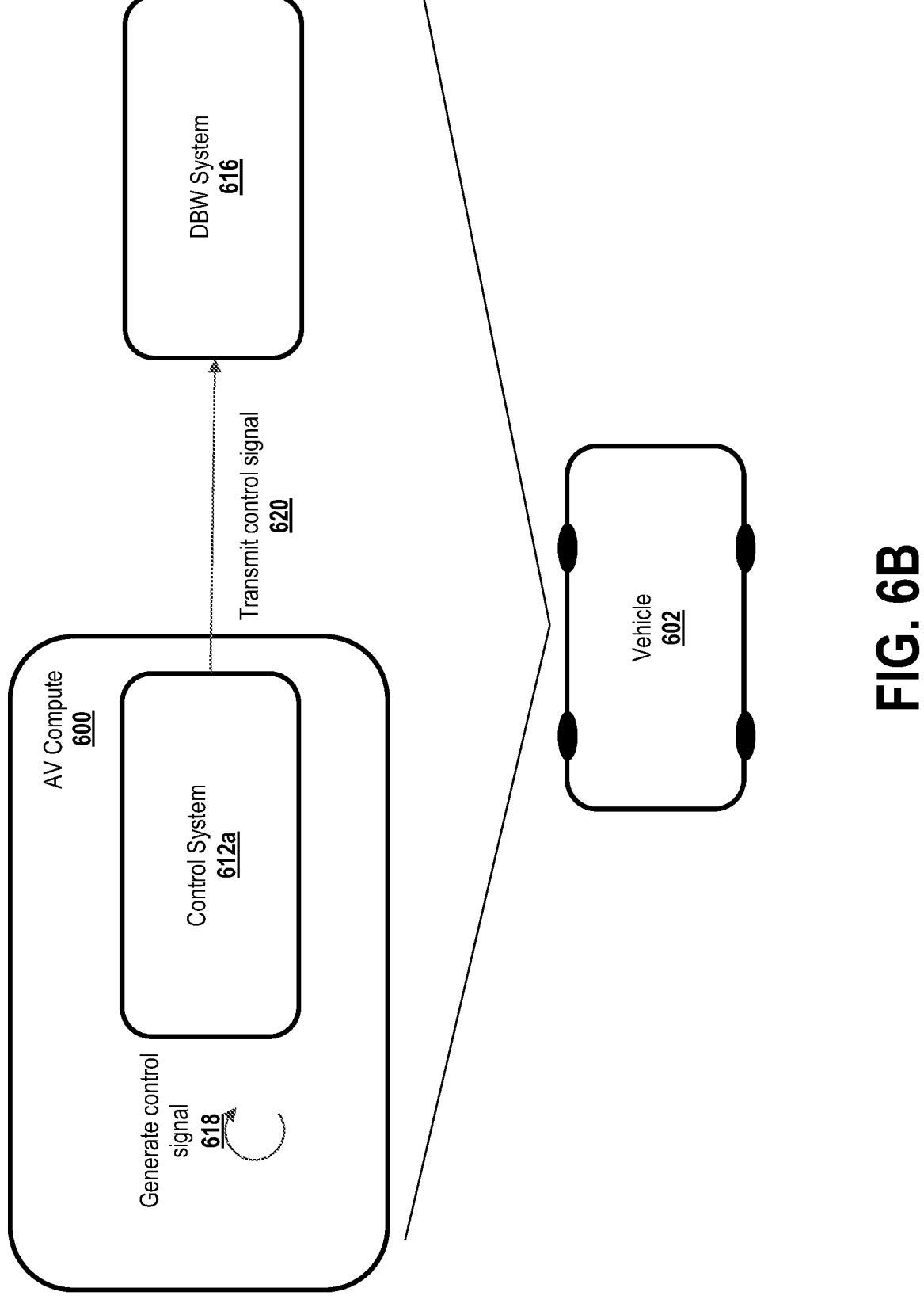

FIGS. 6A-6B are diagrams of an example implementation of a process for considering contingency in trajectory realization. FIGS. 6A-6B show vehicle 602 including an AV compute 600. The vehicle 602 can be an autonomous vehicle, and can be controlled by AV compute 600 (which can be the same or similar to AV compute 540 and/or system 500 of FIG. 5). As shown in FIG. 6A, the AV compute 600 of vehicle 602, is configured to obtain route data 604 and sensor data 603. The AV compute 600 includes a trajectory system 605 and a control system 612, and optionally a planner system that determines a route. The trajectory system 605 includes a homotopy extraction system and a trajectory generation system which are the same or similar to homotopy extraction system 504 and trajectory generation system 505 of FIG. 5.

The AV compute 600 is configured to take the above-discussed actions referred to with respect to FIG. 5 and, using trajectory system 605 to generate and transmit operation data 616 associated with the primary trajectory to a control system 612 (which can be the same or similar to control system 512 of FIG. 5 and/or control system 408 of FIG. 4), such as for operation of vehicle 602. FIG. 6B illustrates a further implementation where the AV compute 640 can generate 618 and transmit control signals 620 from the control system 612a to a DBW system 616, such as for controlling operation of the vehicle 602.

Figure 7A:
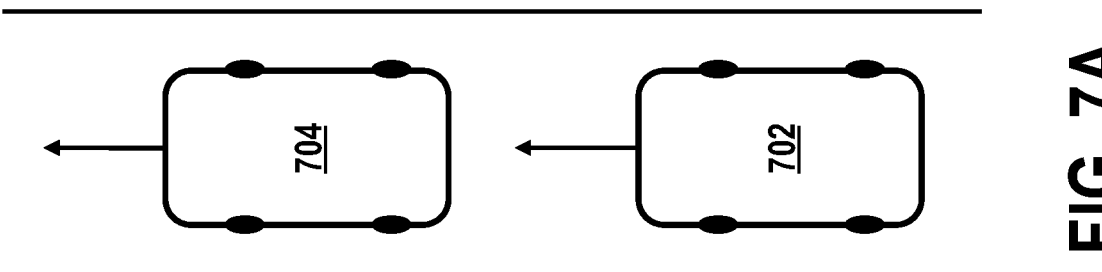
FIGS. 7A-7B are diagrams of an example scenario showing a trajectory realization considering contingency according to this disclosure.
Figure 7B:
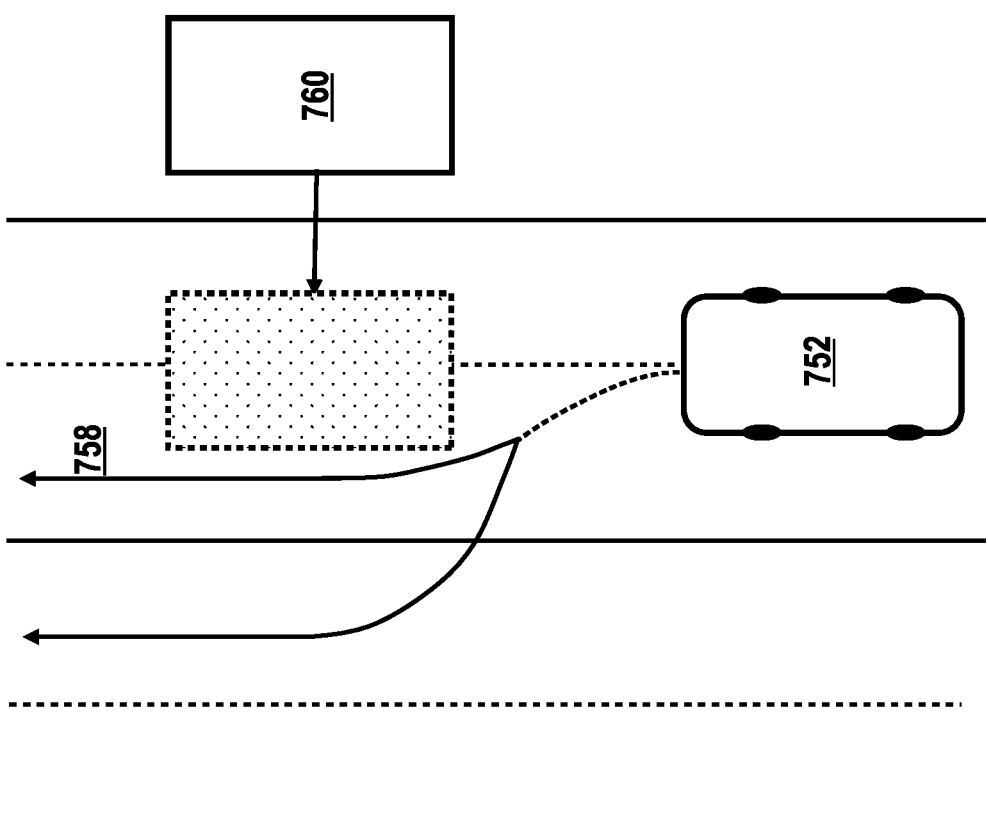
Figure 7B:
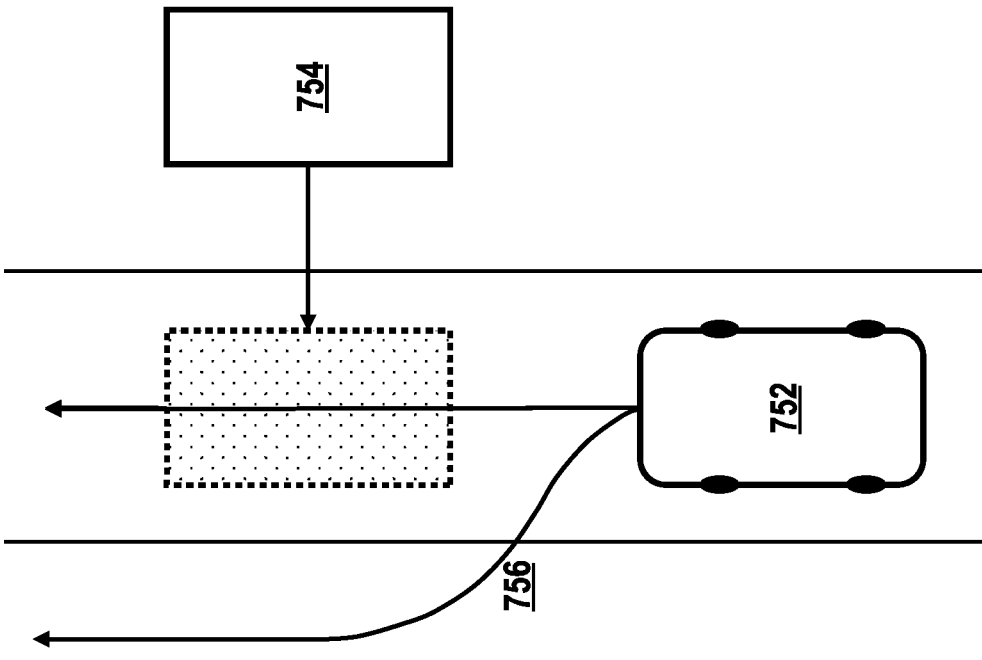

FIGS. 7A-7B are diagrams of example contingency cases in trajectory realization. FIG. 7A shows a first agent 704 followed by the disclosed autonomous vehicle 702. The first agent 704 suddenly decelerates unpredictably and/or comes to a sudden stop. This is seen as a longitudinal contingency. By including a longitudinal contingency in the optimization disclosed, when the first agent 704 in front of the AV 702 brakes or cuts off in front of the AV 702, the disclosed trajectory generation system already takes into account the longitudinal contingency when generating the trajectory set. With this disclosure, the AV 702 remains in a safe state such that it can always safely and proactively slow down to avoid a collision in the event that the longitudinal contingency does occur.

FIG. 7B shows a case with an uncertain or undecisive agent 754 and 760 at the side of the road. This may occur with distracted pedestrians and/or distracted drivers. In the worst case, agents 754 and 760 at the side of the road could enter the lane of the autonomous vehicle 752. This disclosure provides that the trajectory generation system considers agent 754, 760 entering the lane of AV 752 and already provides the biasing trajectories 758 shown in FIG. 7B. Nominally, slowing down may be the safest option when there is enough distance between the autonomous vehicle 752 and an agent but it is not always possible to slow down to avoid a collision. Sometimes changing lanes or swerving may be necessary. In this case by including a lateral contingency with the agent 754, 760 moving in front of the autonomous vehicle 752, the disclosed contingency MPC enables the autonomous vehicle 752 to deviate early to allow the possibility of a feasible lane change. In other words, FIG. 7B shows the resulting primary trajectory 758 when considering both nominal and contingency homotopies jointly as described in this disclosure.

Figure 8:
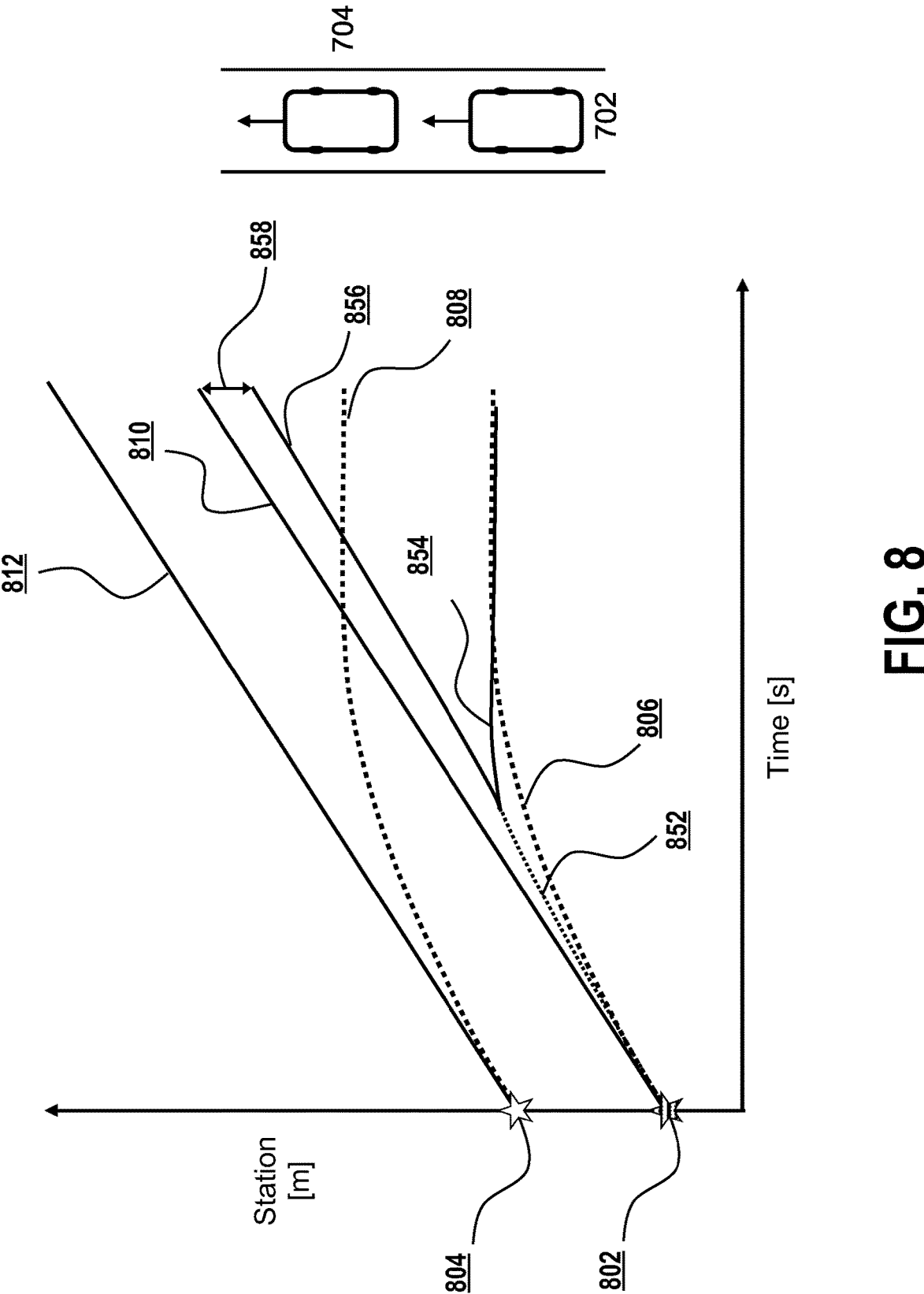
FIG. 8 is a diagram illustrating an example nominal trajectory and an example contingency trajectory for a leading agent assumed to stop.

FIG. 8 is a diagram illustrating station-time plot for an example nominal trajectory and an example contingency trajectory with time in [s] along the x axis and station in [m] along the y axis. FIG. 8 shows an example nominal trajectory 810 for the disclosed AV 702 and an example nominal prediction 812 of an agent 704. The agent 704 starts with a lead position 804, and the disclosed AV 702 with a position 802. In this example, the AV 702 follows the agent 704 which may suddenly brake or stop, the disclosed system determines a prediction 808 associated with the contingency and an equivalent AV braking trajectory 806. The disclosed system determines the optimized trajectory 856 by considering the contingency of the agent possibly performing a sudden brake or stop, resulting in additional distance 858 from the agent compared to the nominal trajectory. The disclosed system determines the contingency trajectory 854. Segment or stem 852 shows the common stem between the optimized trajectory 856 and the contingency trajectory 854.

Referring now to FIG. 9, illustrated is a flowchart of a method or process 900 for determining a trajectory, e.g., taking into account contingency homotopy, such as for operating and/or controlling an AV. The method can be performed by a system disclosed herein, such as an AV compute 202f of FIG. 2 and AV compute 400 of FIG. 4, a vehicle 102, 200, of FIGS. 1 and 2, respectively, device 300 of FIG. 3, and AV compute 540, system 500 of FIG. 5 and implementations of FIGS. 6, and 7A-7B. The system disclosed can include at least one processor which can be configured to carry out one or more of the operations of method 900. The method 900 can be performed (e.g., completely, partially, and/or the like) by another device or group of devices separate from or including system disclosed herein.

The method 900 includes obtaining at step 902, using the at least one processor, sensor data associated with an environment in which a vehicle is operating. In some examples, the environment comprises one or more agents including a first agent. In some examples, the environment comprises no agent, and the sensor data is used for localization and operating the vehicle based on maps.

The method 900 includes at step 904 determining, using the at least one processor, based on the sensor data, a first prediction associated with the first agent (e.g., nominal prediction from predictions that the agent will move to a different location). In one or more examples, where the environment includes no agent but one or more static obstacles, predictions throughout the prediction timespan may be the same.

The method 900 includes at step 906 determining, using at least one processor, based on the first prediction, a primary homotopy associated with nominal operation of the vehicle (e.g., indicative of a drivable corridor, nominal homotopy from homotopy extraction, e.g., maneuver). The primary homotopy can be associated with a first location and a second location, such as a space around a first location, and a space around a second location.

The method 900 includes at step 908 determining, using the at least one processor, based on the primary homotopy and the first prediction, one or more contingency homotopies (e.g., worst-case homotopy) associated with a contingency (e.g., a homotopy generated to prepare for the occurrence of the contingency). In one or more examples, where the environment includes no agent but one or more static obstacles, the contingency homotopy (and optionally predictions) may be determined by considering a hidden agent, such as a pedestrian occluded by a car.

The method 900 includes at step 910 determining, using the at least one processor, based on the primary homotopy and the one or more contingency homotopies, a primary trajectory (e.g., optimized trajectory).

The method 900 includes at step 912 providing, using the at least one processor, operation data associated with the primary trajectory to cause the vehicle to operate based on the primary trajectory.

In one or more example methods, determining (at step 908) based on the primary homotopy and the first prediction, the one or more contingency homotopies includes adding, based on map information (e.g., occluded because of topography) and perception information, at least one hallucinated agent in an occluded part of a map of the operating environment of the vehicle. Step 908 includes for example obtaining the one or more contingency homotopies from a set of predetermined worst-cases (e.g. N candidate contingency homotopies, e.g. combining/selecting/extracting amongst N candidate contingency homotopies to obtain one or more contingency homotopies, less than or equal to N, e.g. at each time slot and/or segment) based on specified scenario (e.g., lead agent hard braking in front of ego, aggressive lane cut-in by agent, actors outside precedence area, jaywalkers, cyclists bending rules) associated with the first agent proximate to the vehicle, such as to an AV. In one or more example methods, the predetermined worst-cases are associated with a location of the vehicle relative to the map (e.g., occluded because of topography). In one or more example methods, the predetermined worst-cases are based on semantics related to the first agent (e.g., parked vehicles with pedestrian present, pedestrian crosswalk behavior) and/or to the environment. In some examples, the contingency homotopy is based on the worst case scenarios with no hallucinated agent.

In one or more example methods, determining (at step 908), based on the primary homotopy and the first prediction, the one or more contingency homotopies includes determining one or more sets of constraints based on the first prediction, wherein each set of constraints characterizes a contingency homotopy. For example, the prediction directly defines the one or more constraints.

In one or more example methods, a set of constraints includes one or more of: one or more spatio-temporal constraints (e.g., one or more spatio-temporal constraints associated with the first agent) and one or more station-time constraints (e.g., one or more station-time constraints associated with the first agent).

In one or more example methods, the first prediction includes at least a first likelihood that the first agent will perform a first action (e.g., a pedestrian stopping, walking through the cross walk, etc., e.g., multi modal prediction).

In one or more example methods, the method 900 includes determining, based on the primary homotopy and the one or more contingency homotopies, one or more contingency trajectories.

In one or more example methods, determining (at step 910) a primary trajectory based on the primary homotopy and the one or more contingency homotopies includes determining the primary trajectory based on the primary homotopy, the one or more contingency homotopies, and a model predictive controller (e.g., applying, using the at least one processor, model predictive control on the first primary homotopy and the one or more contingency homotopies. In other words, the MPC takes as input the primary homotopy, and the one more contingency homotopies and output the optimized trajectory.)

In one or more example methods, determining the primary trajectory based on the primary homotopy, one or more contingency homotopies, and the model predictive controller includes determining, based on one or more actions for the vehicle, the primary trajectory and one more contingency trajectories, wherein the primary trajectory and the one or more contingency trajectories share one or more actions (e.g., for safety, e.g., for one or more stems of a trajectory). The one or more actions may be seen as a set of shared controls and/or a set of shared states (such as a series of shared control and/or a series of shared states, candidate discrete futures). For example, the candidate horizons include a nominal horizon and a contingency horizon.

In one or more example methods, determining one or both of the primary trajectory and the one or more contingency trajectories based on the primary homotopy and the one or more contingency homotopies includes determining a nominal cost for the primary trajectory and one or more contingency costs based on the one or more contingency trajectories, and applying a set of weights to the nominal cost and the one or more contingency costs.

In one or more example methods, each weight in the set of weights is indicative of the probability of particular contingency happening. In one or more example methods, the set of weights includes one or more predetermined weights (e.g., prior to run time, e.g., set/tuned arbitrarily).

In one or more example methods, providing, using the at least one processor, operation data associated with the primary trajectory to cause the vehicle to operate based on the primary trajectory includes scoring the primary trajectory and the one or more contingency trajectories. For example, each primary trajectories belonging to individual nominal homotopies is scored. In one or more example methods, the operation data is based on the scoring of the primary trajectory and the one or more contingency trajectories. In some examples, the output of primary and contingency trajectories is used to provide operation data to cause the autonomous vehicle to operate accordingly.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Disclosed are non-transitory computer readable media comprising instructions stored thereon that, when executed by at least one processor, cause the at least one processor to carry out operations according to one or more of the methods disclosed herein.

Also disclosed are methods, non-transitory computer readable media, and systems according to any of the following items:

Item 1. A method comprising: obtaining, using at least one processor, sensor data associated with an environment in which a vehicle is operating, the environment comprising one or more agents including a first agent; determining, using the at least one processor, a first prediction associated with the first agent based on the sensor data; determining, using the at least one processor, a primary homotopy associated with nominal operation of the vehicle based on the first prediction; determining, using the at least one processor, one or more contingency homotopies associated with contingent operation of the vehicle based on the primary homotopy and the first prediction; determining, using the at least one processor, a primary trajectory based on the primary homotopy and the one or more contingency homotopies; and providing, using the at least one processor, operation data associated with the primary trajectory to cause the vehicle to operate based on the primary trajectory.

Item 2. The method of item 1, wherein determining the one or more contingency homotopies based on the primary homotopy and the first prediction comprises: adding at least one hallucinated agent in an occluded part of a map of the environment of the vehicle; and obtaining the one or more contingency homotopies from a set of predetermined worst-cases based on a specified scenario associated with the first agent proximate to the vehicle or the at least one hallucinated agent.

Item 3. The method of item 2, wherein obtaining the one or more contingency homotopies from the set of predetermined worst-cases comprises: obtaining the one or more contingency homotopies from the set of predetermined worst-cases, the predetermined worst-cases associated with a location of the vehicle relative to the map.

Item 4. The method of any of items 2-3, wherein obtaining the one or more contingency homotopies from the set of predetermined worst-cases comprises: obtaining the one or more contingency homotopies from the set of predetermined worst-cases, the predetermined worst-cases being based on semantics related to the first agent and/or to the environment.

Item 5. The method of any of the previous items, wherein determining the one or more contingency homotopies based on the primary homotopy and the first prediction comprises: determining one or more sets of constraints based on the first prediction, wherein each set of constraints characterizes a contingency homotopy.

Item 6. The method of item 5, wherein determining the one or more sets of constraints based on the first prediction comprises: determining the one or more sets of constraints, where at least one set of constraints of the one or more sets of constraints comprises one or more of: one or more spatio-temporal constraints and one or more station-time constraints.

Item 7. The method of any one of items 1-6, wherein determining the first prediction associated with the first agent based on the sensor data comprises: determining the first prediction associated with the first agent based on the sensor data, where the first prediction is associated with a likelihood that the first agent will perform a first action.

Item 8. The method of any one of items 1-7, the method further comprising: determining one or more contingency trajectories based on the primary homotopy and the one or more contingency homotopies.

Item 9. The method of item 8, further comprising: selecting a selected trajectory from among a plurality of primary trajectories and the one or more contingency trajectories, wherein providing the operation data associated with the primary trajectory to cause the vehicle to operate based on the primary trajectory comprises: providing operation data associated with the contingency trajectory to cause the vehicle to operate based on the contingency trajectory.

Item 10. The method of any one of items 1-9, wherein determining a primary trajectory based on the primary homotopy and the one or more contingency homotopies comprises: determining the primary trajectory based on the primary homotopy, the one more contingency homotopies, and a model predictive controller.

Item 11. The method of item 10, wherein determining the primary trajectory based on the primary homotopy, one or more contingency homotopies, and the model predictive controller comprises: determining the primary trajectory and one more contingency trajectories based on one or more actions for the vehicle, wherein the primary trajectory and the one or more contingency trajectories share one or more actions.

Item 12. The method of any of items 7-11, wherein determining one or both of the primary trajectory and the contingency trajectory based on the primary homotopy and the one or more contingency homotopies comprises: determining a nominal cost for the primary trajectory and one or more contingency costs for the one or more contingency trajectories, and applying a set of weights to the nominal cost and the one or more contingency costs.

Item 13. The method of item 12, further comprising: selecting a selected trajectory from among the plurality of primary trajectories and the one or more contingency trajectories based on a scoring, wherein providing the operation data associated with the primary trajectory to cause the vehicle to operate based on the primary trajectory comprises: providing operation data associated with the contingency trajectory to cause the vehicle to operate based on the contingency trajectory.

Item 14. The method of any of items 12-13, wherein each weight in the set of weights is indicative of a probability of contingency.

Item 15. The method of any of items 12-14, wherein the set of weights comprises one or more predetermined weights.

Item 16. The method of any one of items 1-15, wherein providing operation data associated with the primary trajectory to cause the vehicle to operate based on the primary trajectory comprises: scoring one or more primary trajectories and the one or more contingency trajectories; and wherein providing the operation data associated with the primary trajectory to cause the vehicle to operate based on the primary trajectory comprises: providing operation data associated with the contingency trajectory to cause the vehicle to operate based on the scoring of the primary trajectory and the contingency trajectory.

Item 17. A system, comprising at least one processor; and at least one memory storing instructions thereon that, when executed by the at least one processor, cause the at least one processor to perform operations including: obtaining, using the at least one processor, sensor data associated with an environment in which a vehicle is operating, the environment comprising one or more agents including a first agent; determining, using the at least one processor, a first prediction associated with the first agent based on the sensor data; determining, using the at least one processor, a primary homotopy associated with nominal operation of the vehicle based on the first prediction; determining, using the at least one processor, one or more contingency homotopies associated with a contingent operation of the vehicle based on the primary homotopy and the first prediction; determining, using the at least one processor, a primary trajectory based on the primary homotopy and the one or more contingency homotopies; and providing, using the at least one processor, operation data associated with the primary trajectory to cause the vehicle to operate based on the primary trajectory.

Item 18. The system of item 17, wherein determining the one or more contingency homotopies based on the primary homotopy and the first prediction comprises: adding at least one hallucinated agent in an occluded part of a map of the operating environment of the vehicle; and obtaining the one or more contingency homotopies from a set of predetermined worst-cases based on a specified scenario associated with the first agent proximate to the vehicle or the at least one hallucinated agent.

Item 19. The system of item 18, wherein the predetermined worst-cases are associated with a location of the vehicle relative to the map.

Item 20. The system of any of items 18-19, wherein the predetermined worst-cases are based on semantics related to the first agent and/or to the environment.

Item 21. The system of any of items 17-20, wherein determining the one or more contingency homotopies based on the primary homotopy and the first prediction comprises: determining one or more sets of constraints based on the first prediction, wherein each set of constraints characterizes a contingency homotopy.

Item 22. The system of item 21, wherein the one or more sets of constraints comprises one or more of: one or more spatio-temporal constraints and one or more station-time constraints.

Item 23. The system of any one of items 17-22, wherein the first prediction is associated with a likelihood that the first agent will perform a first action.

Item 24. The system of any one of items 17-23, the operations further including: determining one or more contingency trajectories based on the primary homotopy and the one or more contingency homotopies.

Item 25. The system of item 24, the operations further comprising: selecting a selected trajectory from among a plurality of primary trajectories and the one or more contingency trajectories, wherein providing the operation data associated with the primary trajectory to cause the vehicle to operate based on the primary trajectory comprises: providing operation data associated with the contingency trajectory to cause the vehicle to operate based on the contingency trajectory.

Item 26. The system of any one of items 17-25, wherein determining a primary trajectory based on the primary homotopy and the one or more contingency homotopies comprises: determining the primary trajectory based on the primary homotopy, the one more contingency homotopies, and a model predictive controller.

Item 27. The system of item 26, wherein determining the primary trajectory based on the primary homotopy, one or more contingency homotopies, and the model predictive controller comprises: determining the primary trajectory and one more contingency trajectories based on one or more actions for the vehicle, wherein the primary trajectory and the one or more contingency trajectories share one or more actions.

Item 28. The system of any of items 23-27, wherein determining one or both of the primary trajectory and the contingency trajectory based on the primary homotopy and the one or more contingency homotopies comprises: determining a nominal cost for the primary trajectory and one or more contingency costs for the one or more contingency trajectories, and applying a set of weights to the nominal cost and the one or more contingency costs.

Item 29. The system of item 28, the operations further comprising: selecting a selected trajectory from among the plurality of primary trajectories and the one or more contingency trajectories based on the nominal cost and the one or more contingency costs, wherein providing the operation data associated with the primary trajectory to cause the vehicle to operate based on the primary trajectory comprises: providing operation data associated with the contingency trajectory to cause the vehicle to operate based on the contingency trajectory.

Item 30. The system of any of items 28-29, wherein each weight in the set of weights is indicative of the probability of particular contingency happening.

Item 31. The system of any of items 28-30, wherein the set of weights comprises one or more predetermined weights.

Item 32. The system of any one of items 17-31, wherein providing operation data associated with the primary trajectory to cause the vehicle to operate based on the primary trajectory comprises: scoring one or more primary trajectories and the one or more contingency trajectories; and wherein providing the operation data associated with the primary trajectory to cause the vehicle to operate based on the primary trajectory comprises: providing operation data associated with the contingency trajectory to cause the vehicle to operate based on the scoring of the primary trajectory and the contingency trajectory.

Item 33. A non-transitory computer readable medium comprising instructions stored thereon that, when executed by at least one processor, cause the at least one processor to carry out operations according to any of items 1-16.

What is claimed is:

1. A method comprising:

obtaining, using at least one processor, sensor data associated with an environment in which an autonomous vehicle is operating, the environment comprising one or more agents including a first agent;

determining, using the at least one processor, a first prediction associated with the first agent based at least in part on the sensor data;

determining, using the at least one processor, a second prediction associated with the first agent based at least in part on the sensor data;

determining, using the at least one processor, a primary homotopy associated with nominal operation of the autonomous vehicle based at least in part on the first prediction;

determining, using the at least one processor, a primary trajectory located within the primary homotopy;

determining, using the at least one processor, one or more contingency homotopies associated with contingent operation of the autonomous vehicle based at least in part on the second prediction;

determining, using the at least one processor, one or more contingency trajectories located within the one or more contingency homotopies, wherein determining one or more contingency trajectories comprises:

determining one or more contingency costs for the one or more contingency trajectories; and applying a set of weights to the one or more contingency costs;

modifying, using the at least one processor, the primary trajectory based at least in part on the one or more contingency homotopies, wherein the modified primary trajectory is not a contingency trajectory of the one or more contingency trajectories; and causing operation of the autonomous vehicle based at least in part on the modified primary trajectory.

2. The method of claim 1, wherein determining the one or more contingency homotopies based at least in part on the second prediction comprises:

adding at least one hallucinated agent in an occluded part of a map of the environment of the autonomous vehicle; and obtaining the one or more contingency homotopies from a set of predetermined worst-cases based at least in part on a specified scenario associated with the first agent proximate to the autonomous vehicle or the at least one hallucinated agent.

3. The method of claim 2, wherein the set of predetermined worst-cases are associated with a location of the autonomous vehicle relative to the map.

4. The method of claim 2, wherein the set of predetermined worst-cases are based at least in part on semantics related to the first agent and/or to the environment.

5. The method of claim 1, wherein determining the one or more contingency homotopies based at least in part on the second prediction comprises:

determining one or more sets of constraints based at least in part on the first prediction, wherein each set of constraints characterizes a contingency homotopy.

6. The method of claim 5, wherein determining the one or more sets of constraints based at least in part on the first prediction comprises:

determining the one or more sets of constraints, where at least one set of constraints of the one or more sets of constraints comprises one or more of: one or more spatio-temporal constraints and one or more station-time constraints.

7. The method of claim 1, wherein determining the first prediction associated with the first agent based at least in part on the sensor data comprises:

determining the first prediction associated with the first agent based at least in part on the sensor data, where the first prediction is associated with a likelihood that the first agent will perform a first action.

8. The method of claim 1, further comprising:

selecting a selected trajectory from among the primary trajectory and the one or more contingency trajectories, wherein causing operation of the autonomous vehicle based at least in part on the modified primary trajectory comprises:

causing operating of the autonomous vehicle based at least in part on the selected trajectory.

9. The method of claim 1, wherein modifying the primary trajectory based at least in part on the one or more contingency homotopies comprises:

determining the primary trajectory and one or more contingency trajectories based at least in part on one or more actions for the autonomous vehicle, wherein the modified primary trajectory and the one or more contingency trajectories share one or more actions.

10. The method of claim 7, wherein determining the primary trajectory within the primary homotopy and the one or more contingency trajectories within the one or more contingency homotopies comprises:

determining a nominal cost for the primary trajectory and one or more contingency costs for the one or more contingency trajectories, and applying a set of weights to the nominal cost and the one or more contingency costs.

11. The method of claim 1, wherein each weight of the set of weights is indicative of a probability.

12. The method of claim 10, wherein the set of weights comprises one or more predetermined weights.

13. A system, comprising at least one processor; and at least one memory storing instructions thereon that, when executed by the at least one processor, cause the at least one processor to perform operations including:

obtaining, using the at least one processor, sensor data associated with an environment in which an autonomous vehicle is operating, the environment comprising one or more agents including a first agent;

determining, using the at least one processor, a first prediction associated with the first agent based at least in part on the sensor data;

determining, using the at least one processor, a second prediction associated with the first agent based at least in part on the sensor data;

determining, using the at least one processor, a primary homotopy associated with nominal operation of the autonomous vehicle based at least in part on the first prediction;

determining, using the at least one processor, a primary trajectory located within the primary homotopy;

determining, using the at least one processor, one or more contingency homotopies associated with a contingent operation of the autonomous vehicle based at least in part on the second prediction;

determining, using the at least one processor, one or more contingency trajectories located within the one or more contingency homotopies, wherein determining one or more contingency trajectories comprises:

determining one or more contingency costs for the one or more contingency trajectories; and applying a set of weights to the one or more contingency costs;

modifying, using the at least one processor, the primary trajectory based at least in part on the one or more contingency homotopies, wherein the modified primary trajectory is not a contingency trajectory of the one or more contingency trajectories; and causing, using the at least one processor, operation of the autonomous vehicle based at least in part on the modified primary trajectory.

14. The system of claim 13, wherein determining the one or more contingency homotopies based at least in part on the second prediction comprises:

adding at least one hallucinated agent in an occluded part of a map of the environment in which the autonomous vehicle is operating; and obtaining the one or more contingency homotopies from a set of predetermined worst-cases based at least in part on a specified scenario associated with the first agent proximate to the autonomous vehicle or the at least one hallucinated agent.

15. The system of claim 14, wherein the set of predetermined worst-cases are associated with a location of the autonomous vehicle relative to the map.

16. The system of claim 14, wherein the set of predetermined worst-cases are based at least in part on semantics related to the first agent.

17. A computer-readable medium comprising computer-executable instructions that, when executed by at least one processor, cause the at least one processor to perform operations including:

obtaining, using the at least one processor, sensor data associated with an environment in which an autonomous vehicle is operating, the environment comprising one or more agents including a first agent;

determining, using the at least one processor, a first prediction associated with the first agent based at least in part on the sensor data;

determining, using the at least one processor, a second prediction associated with the first agent based at least in part on the sensor data;

determining, using the at least one processor, a primary homotopy associated with nominal operation of the autonomous vehicle based at least in part on the first prediction;

determining, using the at least one processor, a primary trajectory located within the primary homotopy;

determining, using the at least one processor, one or more contingency homotopies associated with a contingent operation of the autonomous vehicle based at least in part on the second prediction;

determining, using the at least one processor, one or more contingency trajectories located within the one or more contingency homotopies, wherein determining one or more contingency trajectories comprises:

determining one or more contingency costs for the one or more contingency trajectories; and applying a set of weights to the one or more contingency costs;

modifying, using the at least one processor, the primary trajectory based at least in part on the one or more contingency homotopies, wherein the modified primary trajectory is not a contingency trajectory of the one or more contingency trajectories; and causing, using the at least one processor, operation of the autonomous vehicle based at least in part on the modified primary trajectory.

18. The method of claim 7, wherein determining the primary trajectory located within the primary homotopy comprises:

determining a nominal cost for the primary trajectory, and applying a weight to the nominal cost.

* * * * *